Patented Sept. 12, 1939

2,172,803

UNITED STATES PATENT OFFICE 2,172,803

POLYCARBOXYLIC ACID ESTERS

Russell McGill, Arden, Del., assignor to E. I. du Pont de Nemours & Company, Wilmington, Del., a corporation of Delaware No Drawing. Application March 15, 1937, Serial No. 131,108

12 Claims. (Cl. 260—485)

This invention relates to esters, more particularly to esters of aliphatic monohydric alpha-ketols, and still more particularly to their preparation from alkynylcarbinols and certain polycarboxylic acids.

Mercury compounds have been used as catalysts for the addition of water, acids, alcohols, and aromatic hydrocarbons to acetylenic compounds, to form carbonyl compounds, vinyl esters, ketals (acetals from acetylene), and substituted ethanes respectively. However, mercury compounds have not been used in, nor is there indication of any prior work on the catalysed or uncatalysed simultaneous esterification and hydration of acetylenic alcohols to form ketol esters. Further, in additions where mercury salts are used, the addenda have hitherto invariably been found attached after reaction to what was originally an acetylenic carbon atom. In the case of this invention, the addenda are found attached to a carbon adjacent to the actylenic carbon while the acetylenic bond has been hydrated.

This invention has as an object the provision of a novel, economical and convenient process for the preparation of alpha-ketol esters of saturated aliphatic polycarboxylic acids. A further object is the utilization of alkynylcarbinols in the preparation of these esters. A further object is the preparation of new solvents, plasticizers, resin intermediates, alcohol denaturants and pesticidal ingredients. Further objects will appear hereinafter.

These objects are accomplished by the following invention where a saturated aliphatic polycarboxylic acid having an ionization constant below 0.0007 is reacted, in the presence of catalytic amounts of a mercuric salt of a carboxylic acid with an alkynylcarbinol in which the alkynyl group is attached, by one of its acetylenic carbons, to the carbinol group. A simultaneous esterification and hydrolysis takes place, resulting in the formation of an ester of the polycarboxylic acid with an alpha-ketol, i. e. a ketoalcohol having the characteristic grouping

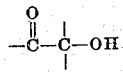

Insofar as is known, these esters are new compounds. They are all included within the general formula

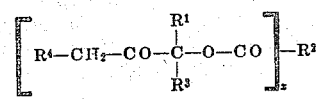

where $R^1$, $R^3$, and $R^4$ are hydrogen or hydrocarbon radicals, and $R^2$ is the radical of an aliphatic saturated polycarboxylic acid obtained by removing the carboxyls therefrom, and $x$ is the valence of $R^2$.

The alkynylcarbinols suitable for use in this invention may be prepared as described in co-pending application of Oscar R. Kreimeier, Ser. Nos. 91,622 and 91,623, filed July 20, 1936 which have issued January 25, 1938 as U. S. Patents 2,106,180 and 2,106,181, respectively. In all these carbinols, the alkynyl carbinol groups are adjacent. While the reason is not definitely known, I have been unable to carry out the process successfully with other types of alkynylcarbinols.

In the more detailed practice of the invention, the acid and mercuric catalyst are first heated to reaction temperature (usually about 120° C.), preferably in the presence of a liquid reaction medium of the type given below, and the alkynylcarbinol then added. The reaction which takes place readily with the evolution of considerable heat is more conveniently controlled by regulating the rate of addition of the carbinol. The reaction temperature is maintained by external heating for a short period (½ to 1 hours) after addition of the alkynylcarbinol in order to insure complete reaction. The mixture is then cooled and filtered to remove any metallic mercury produced by reduction of the catalyst. Unreacted acid may be removed by neutralization before the ketol ester is purified by distillation.

The reaction is preferably carried out in the presence of a liquid medium which may be an excess of the acid or carbinol being reacted or an inert organic solvent for the reactants such as an ether, hydrocarbon, or chlorinated aliphatic hydrocarbon. The mercuric salt used as a catalyst is preferably but not necessarily a salt of the acid being reacted, and in such case it may be made in situ by adding mercuric oxide to the acid.

The invention has been discussed above in detail. The following exemplification of the invention is added for the further illustration thereof and not in limitation. In this example the parts are by weight.

EXAMPLE I

*3-methyl-3-hydroxybutanone-2 adipate*

A solution of 10 parts of mercuric acetate and 73 parts of adipic acid in 300 parts of dry xylene was heated to boiling in a reaction vessel fitted with a reflux condenser. Heating was then discontinued and a solution of 10 parts of mercuric acetate in 127 parts of dimethylethynylcarbinol was added through the condenser at such a rate that the reaction proceeded briskly, boiling being maintained by the heat of reaction. The temperature of the mixture was held at about 125° C. for 30 minutes after the addition of the dimethylethynylcarbinol. The solution was cooled and decanted from the precipitated metallic mercury onto cracked ice. The excess acid was neutralized with sodium hydroxide. The oil which separated was dried and distilled under reduced pressure. The desired ester was obtained in 64% yield. Properties: B. P. 208–210° C./10 mm; M. P. 58–59° C.; saponification number 358 (calc'd. 357).

The process of the present invention is illustrated in the example given above. The components and conditions are susceptible of considerable variation. Thus I may use any substantially anhydrous saturated aliphatic (including alicyclic) polycarboxylic acid having an ionization constant of less than 0.0007, including the following:

| Acid | Ionization constant (first hydrogen) |
|---|---|
| Succinic | 0.000066 |
| Glutaric | 0.000047 |
| Adipic | 0.0000363 |
| Hexahydrophthalic—cis | 0.000044 |
| trans | 0.000062 |
| Suberic | 0.0000298 |
| Sebacic | 0.000027 |
| Mucic | 0.00003 |
| Malic | 0.0004 |
| Suberonic | 0.00003 |
| Tricarballylic | 0.000215 |

The following acids are unsuited for use in the invention. It will be noted that their ionization constants are all above 0.0007.

| Acid | Ionization constant (first hydrogen) |
|---|---|
| Maleic | 0.015 |
| Fumaric | 0.001 |
| Malonic | 0.00161 |
| Oxalic | 0.038 |
| Phthalic | 0.00126 |
| Tartaric | 0.0011 |
| Citric | 0.0008 |
| Propenyltricarboxylic | 0.00299 |

The unsaturated acids containing a triple bond are not suited to this reaction since the triple bond tends to cause the acid to undergo side reactions catalyzed by the mercury catalyst.

Any alkynylcarbinol in which the carbinol group is attached to an acetylenic carbon may be employed in the invention. Carbinols which may be substituted for that of the example include propargyl alcohol, methylpropargyl alcohol, ethylpropargyl alcohol, hexylpropargyl alcohol, methylethynylcarbinol, ethylethynylcarbinol, ethylhexynylcarbinol, isopropylethynylcarbinol, hexylethynylcarbinol, vinylethynylcarbinol, chloromethylethynylcarbinol, dimethylethynylcarbinol, methylethylethynylcarbinol, methylpropylethynylcarbinol, diethylethynylcarbinol, methylisobutylethynylcarbinol, methylamylethynylcarbinol, di-isopropylethynylcarbinol, 1-ethynylcyclohexanol, methylphenylethynylcarbinol, isopropylphenylethynylcarbinol diethylphenylethynylcarbinol, dimethylpropynylcarbinol, methylpropylbutynylcarbinol, and butylamylethynylcarbinol.

The reaction of simultaneous hydration and esterification of alkynylcarbinols takes place most satisfactory at temperature of about 120° C. The process is operable from 0° to 160° C., but a temperature range of 110–135° C. is preferred. In repeating the procedure of Example I but at 10° C., reaction took place, but the yield was lower.

The process may be carried out in an excess of either reactant or in the presence of such inert solvents for the reactants as benzene, toluene, xylene, cymene, anisol, dibutyl ether, dioxane, carbon tetrachloride dichlorodiethyl ether, etc. It is preferable to employ a solvent boiling in the neighborhood of or just above the temperature of reaction, but lower boiling solvents may be used by appropriate change of conditions, e. g. application of pressure.

In the example given 0.03–0.06 mol of mercuric salt catalyst per mol of alkynylcarbinol was used. The amount of catalyst may be varied outside these limits. Larger quantities may be used and may even be necessary where the alkynylcarbinol reduces the catalyst rapidly. In this case the reduction of the catalyst may be partially prevented and the amount needed be reduced by adding it in small portions during the course of the reaction. In cases where the catalyst is not reduced smaller quantities may be used, e. g., 0.01 mol or even less.

The ketol esters prepared and described herein may be used as solvents or softeners for cellulose derivatives, e. g., cellulose nitrate, cellulose acetate, ethyl cellulose, and benzyl cellulose; as ingredients of pesticides; as resin intermediates, alcohol denaturants; as dye intermediates and as perfume fixatives.

The outstanding feature of the process of the present invention is that the hitherto unknown alpha-ketol esters of saturated aliphatic polycarboxylic acids can be made in one step directly from alkynylcarbinols by a simultaneous esterification and hydration. A surprising feature of the process is that the order of reaction facility—viz., tertiary, secondary, and primary alkynylcarbinols—is the inverse of that of esterification. A further unusual feature of the invention is that the water of esterification adds to the triple bond while the acyl radical (from the acid) is eventually found attached to a carbon atom which was not a part of the acetylene group. In all other reactions where mercury catalyzes an addition, the addenda are eventually found on a carbon atom which was part of the acetylenic group. This is true in the preparation of vinyl acetate, ethylidene diacetate, ketals (acetals from acetylene), and ketones from acetylenes.

The above description and examples are intended to be illustrative only. Any modification or or variation therefrom which conforms to the spirit of the invention is intended to be included within the scope of the claims.

I claim:

1. Process of preparing alpha ketol esters which comprises reacting, in the presence of a mercuric salt of a carboxylic acid, a polycarboxylic acid having an ionization constant of less than 0.0007 with an alkynylcarbinol wherein the carbinol group is joined to an acetylenic carbon.

2. Process of preparing alpha ketol esters which comprises reacting, in the presence of a mercuric salt of a carboxylic acid, an aliphatic saturated polycarboxylic acid having an ionization constant of less than 0.0007 with an alkynylcarbinol wherein the carbinol group is joined to an acetylenic carbon.

3. Process of preparing alpha ketol esters according to claim 2 in which the mercuric salt is that of the acid being reacted.

4. Process of preparing alpha ketol esters according to claim 2 which is carried out in the presence of an excess of one of the reactants.

5. Process of preparing alpha ketol esters according to claim 2 which is carried out in the presence of an inert liquid solvent for the reactants.

6. Alpha-ketol esters of the formula

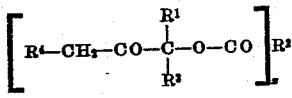

wherein $R^1$, $R^3$ and $R^4$ are members of the class consisting of hydrogen atoms and monovalent hydrocarbon radicals, $R^2$ is the radical of a saturated aliphatic (including alicyclic) polycarboxylic acid obtained by removal of the carboxyls therefrom said acid having an ionization constant of less than 0.0007, and $x$ is the valence of $R^2$.

7. The adipate of 3-methyl-3-hydroxybutanone-2.

8. An ester of an aliphatic monohydric alpha ketol with a saturated aliphatic (including alicyclic) polycarboxylic acid having an ionization constant of less than 0.0007, the radical of said ketol being the only alcohol radical present in the ester.

9. An ester of an aliphatic monohydric alpha ketol with adipic acid, the radical of said ketol being the only alcohol radical present in the ester.

10. An ester of an aliphatic monohydric alpha ketol with hexahydrophthalic acid, the radical of said ketol being the only alcohol radical present in the ester.

11. An ester of an aliphatic monohydric alpha ketol with sebacic acid, the radical of said ketol being the only alcohol radical present in the ester.

12. Process which comprises reacting adipic acid with dimethylethynylcarbinol in the presence of mercuric acetate.

RUSSELL McGILL.